United States Patent [19]

Higasa

[11] Patent Number: 5,499,227

[45] Date of Patent: Mar. 12, 1996

[54] INFORMATION RECORDING AND REPRODUCING APPARATUS

[75] Inventor: Masashi Higasa, Tokyo, Japan

[73] Assignee: NEC Corporation, Japan

[21] Appl. No.: 275,791

[22] Filed: Jul. 15, 1994

[30] Foreign Application Priority Data

Jul. 23, 1993 [JP] Japan .................... 5-182970

[51] Int. Cl.$^6$ ..................................... G11B 7/00
[52] U.S. Cl. ............................ 369/59; 369/116; 369/54; 369/58
[58] Field of Search ................ 369/59, 58, 53, 369/54, 47, 48, 116, 112, 109

[56] References Cited

U.S. PATENT DOCUMENTS 5,150,351  9/1992  Ohno et al. ......................... 369/116
5,305,297  4/1994  Nishiuchi et al. ................... 369/116

*Primary Examiner*—Ali Neyzari
*Assistant Examiner*—Muhammad N. Edun
*Attorney, Agent, or Firm*—Laff, Whitesel, Conte & Saret, Ltd.

[57] ABSTRACT

A recording pulse circuit first divides a recording pulse into multiple pulses in accordance with a recording reference clock signal to generate a short-pulse group. The recording pulse circuit then connects a preset number of pulses of the short-pulse group beginning with a top one of the pulses of the short-pulse group to form a top long pulse. Finally, the recording pulse circuit shifts the positions of the front edge and the rear edge of the top long pulse by a designated time, and outputs the shifted top long pulse and the following pulses of the short-pulse group as recording pulses to a semiconductor laser drive circuit.

4 Claims, 4 Drawing Sheets

INFORMATION RECORDING AND REPRODUCING APPARATUS

BACKGROUND OF THE INVENTION

1. Field of the Invention

This invention relates to an information recording and reproducing apparatus, and more particularly to an information recording and reproducing apparatus wherein a recording pulse signal is first converted into an optical pulse signal by intensity modulation and the optical pulse signal is optically recorded onto a rotating information recording medium in accordance with a mark length recording method to form a recorded mark train, and the recorded mark train is then optically reproduced.

2. Description of the Prior Art

Conventionally, in an optical disk apparatus wherein information is optically recorded onto a rotating information recording medium and thereafter the information is optically reproduced, recording of the information onto the information recording medium is performed for example by irradiating an intensity modulated beam of light upon the surface of the information recording medium to raise the temperature at an area upon which the beam of light of high power is irradiated so as to vary the shape or crystal condition of the information recording medium, or by employing an external magnetic field to change the direction of magnetization of the information recording medium, thereby forming recorded marks on the information recording medium.

Recording and reproduction of information by a conventional information recording and reproducing apparatus is described in detail with reference to FIG. 1.

In order to record information onto an information recording medium using the mark length recording method, recording data 401 are converted into intensity modulated optical pulses 402 by means of a semiconductor laser drive circuit and a semiconductor laser, and optical pulses 402 are irradiated upon the surface of the information recording medium to form recorded mark train 403 on the surface of the information recording medium. However, from the thermal conductivity characteristic of the information recording medium, the rear half of a portion of the information recording medium at which optical pulse 402 is irradiated has a greater area at which the temperature rises high than the front half, and consequently, recorded marks 411, 412 and 413 have a shape like a tear-drop.

When recorded mark train 403 formed in this manner is reproduced, the front edge of reproduced signal 404 has a gentle inclination than the rear edge, and reproduced pulses 405 obtained by pulsation of reproduced signal 404 have greater timing jitter at the front edge than at the rear edge.

Meanwhile, when the distance between two arbitrary successive recorded marks such as recorded marks 412 and 413 decreases, an edge shift phenomenon 414 occurs wherein the front edge of recorded mark 413 following recorded mark 412 is shifted forward from the position at which it should originally be formed, due to the accumulation or the transfer of heat produced when recording mark 412 is formed.

Thus, as means for reducing the influence of heat produced when recording the immediately prior recorded mark, thereby reducing the edge shift phenomenon, a recording method (hereinafter referred to as pulse train recording method) which uses recording pulses obtained by dividing a single recording pulse into multiple pulses by a reference clock signal for formation of recording pulses or some other suitable clock signal is adopted. In particular, according to the recording method, multi-divided pulses 406 are produced from recording data 401 and then modulated by intensity modulation so that they are converted into pulse train optical pulses 407 to be used for recording. In this instance, since multi-divided pulses are used, the energy is dispersed, resulting in reduction of the difference between the areas at the front edge portion and the rear edge portion.

However, even where the pulse train recording method is adopted, since a phenomenon still occurs whereby the area of the rear half of a recorded mark within which the temperature of the surface of the medium rises high is greater than that of the front half, recorded marks 415 to 417 have a tear-drop shape and reproduced signal 409 has a gentle inclination at the front edge than at the rear edge, and reproduced pulse 410 obtained by pulsation of reproduced signal 409 exhibits greater timing jitter at the front edge than at the rear edge.

Further, since the position of the top of a recording pulse is fixed, as the distance between two arbitrary successive recorded marks such as recorded marks 416 and 417 decreases, the front edge of rear recorded mark 417 is shifted forward from the position at which it should originally be formed, due to accumulation or transfer of heat produced when forming front recorded mark 416. In other words, even if the pulse train recording method is adopted, the edge shift phenomenon 418 cannot be eliminated.

Furthermore, in the pulse train recording method, since a recording pulse is divided into multiple recording pulses, when the peak power of the laser beam is equal to the peak power of a laser beam in the ordinary mark length recording method described above, the energy amount of the beam of light irradiated upon the surface of the information recording medium is small. Accordingly, in order to stably form recorded marks, the peak power of the laser beam of recording pulses must be set higher than the power used in method of ordinary mark length recording.

SUMMARY OF THE INVENTION

It is an object of the present invention to provide an information recording and reproducing apparatus wherein recorded marks are formed stably and the timing jitter of a reproduced pulse at the front edge of a recorded mark is reduced.

It is another object of the present invention to provide an information recording and reproducing apparatus wherein the edge shift phenomenon upon high density recording is canceled without the necessity of a high output semiconductor laser and wherein the reliability of reproduced data is high.

In order to attain the objects described above in accordance with the present invention, there is provided an information recording and reproducing apparatus which comprises: recording pulse generating means for dividing a recording pulse signal into multiple pulses with a clock pulse signal, which makes a reference for production of a recording signal, to form a short-pulse group, for connecting an arbitrary number of pulses of the short-pulse group beginning with a top one of the pulses of the short-pulse group to produce a top long pulse, for shifting the positions of the front edge and the rear edge of the top long pulse, and for outputting the shifted top long pulse and the following pulses of the short-pulse group as recording pulses; semiconductor laser drive means for inputting the recording pulses generated by the recording pulse generation means and converting the recording pulses into semiconductor laser drive current; a semiconductor laser driven by the semiconductor laser drive current for irradiating intensity modulated laser emission light upon the surface of an information recording medium to form recorded marks and for irradiating laser emission light controlled for recorded data reproduction upon the surface of the information recording medium; light reception means for receiving reflected light of the laser emission light controlled for recorded data reproduction from the surface of the information recording medium; reproduction means for converting an output signal of the light reception means into a reproduced signal; and pulsation means for pulsating the reproduced signal to generate reproduced pulses.

Since the energy at the top portion of a recording optical pulse is higher than the energy at a portion succeeding the top portion, the shape of a recorded mark can be improved over the tear-drop shape produced by conventional recording means, the timing jitter of reproduced pulses at the front edges of recorded marks can be reduced, and the reproduction phase margin can be assured.

Further, in high density recording, by variably controlling the position of the top edge of recording pulses, the edge shift phenomenon, wherein sample points of data vary depending upon the distance between adjacent recorded marks in the data train, can be canceled, and the dispersion of the positions of reproduced data with respect to the center of a reproduction window can be reduced to enhance the reliability of the reproduction.

Furthermore, since higher thermal energy can be obtained than the thermal energy obtained by the pulse train recording method which is conventionally employed as a countermeasure for improving the edge shift, the laser peak power necessary for recording can be reduced compared with the pulse train recording method, and a high output semiconductor laser is not needed.

The above and other objects, features and advantages of the present invention will become apparent from the following description by referring to the accompanying drawings which illustrate an example of the present invention.

DETAILED DESCRIPTION OF THE PREFERRED EMBODIMENT

Figure 1:
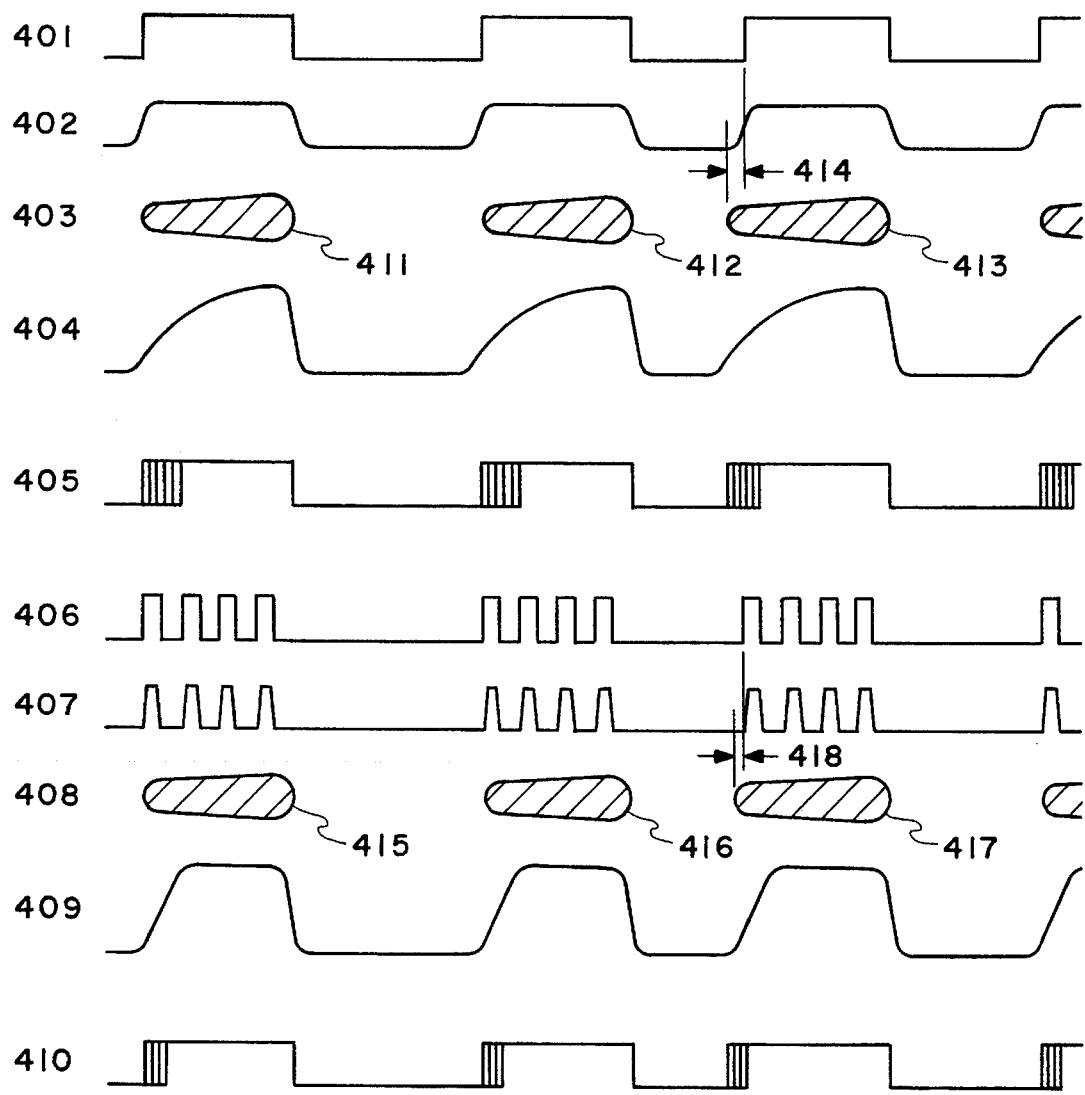
FIG. 1 is a diagram showing the waveforms of recording pulses generated by a conventional information recording and reproducing apparatus, recorded marks recorded on the surface of an information recording medium, and a reproduced signal.
Figure 2:
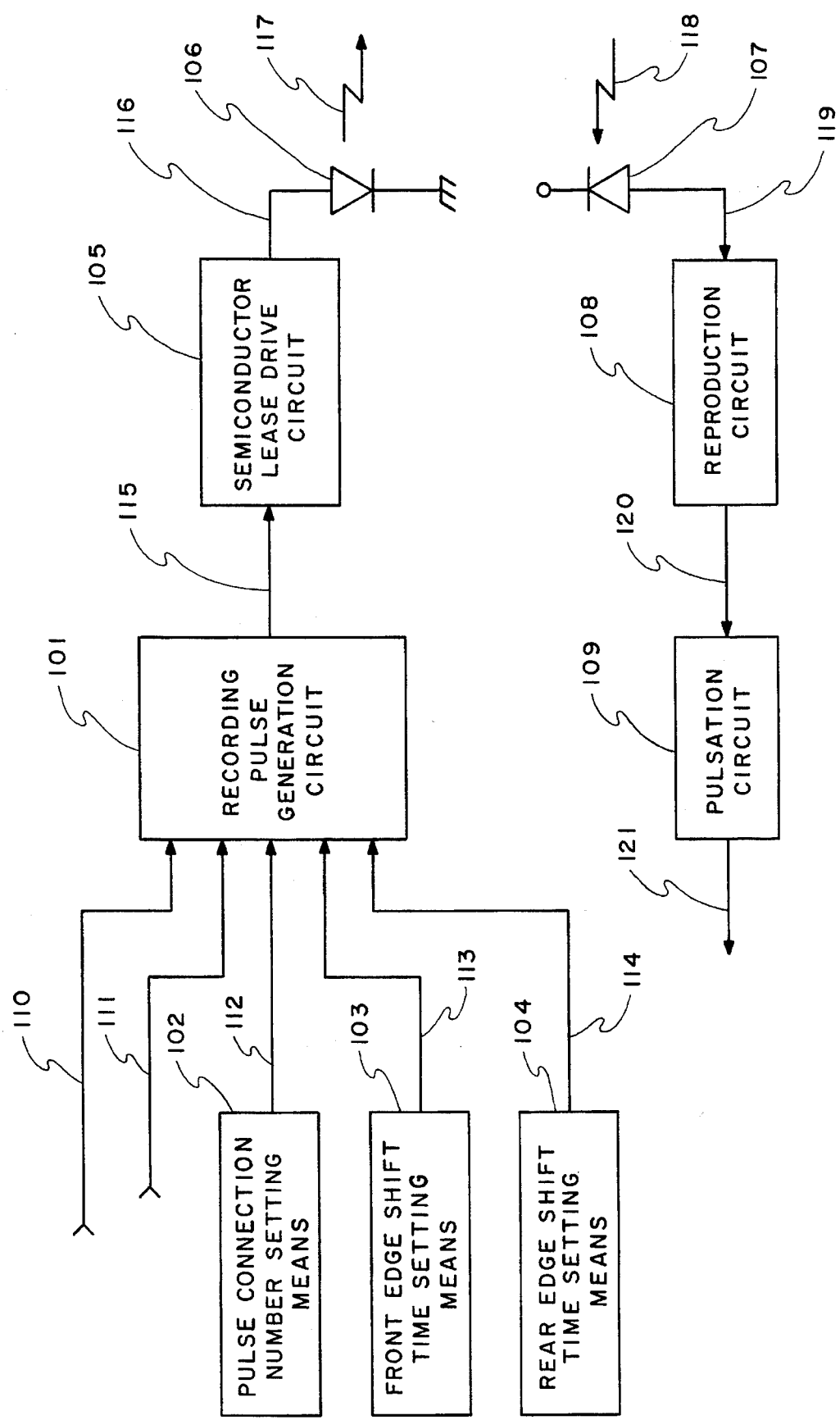
FIG. 2 is a block diagram of an information recording and reproducing apparatus of an embodiment of the present invention.

Referring to FIG. 2, the information recording and reproducing apparatus of the present invention includes recording pulse generation circuit 101, pulse connection number setting means 102, front edge shift time setting means 103, rear edge shift time setting means 104, semiconductor laser drive circuit 105, semiconductor laser 106, photodiode 107, reproduction circuit 108, and pulsation circuit 109.

To recording pulse generation circuit 101 are inputted recording data 110, recording reference clock signal 111, pulse connection number setting signal 112 from pulse connection number setting means 102, front edge shift time setting signal 113 from front edge shift time setting means 103, and rear edge shift time setting signal 114 from rear edge shift time setting means 104, and recording pulse generation circuit 101 generates recording pulse signal 115. In particular, recording pulse generation circuit 101 divides recording data 110 by recording reference clock signal 111 into multiple pulses to form a short-pulse group, and then connects the same number of pulses of the short-pulse group that begins with the pulse at the top as is represented by pulse connection number setting signal 112 to form a top long pulse. Further, recording pulse generation circuit 101 shifts the position of the rear edge of the top long pulse by a time indicated by rear edge shift time setting signal 114, shifts the position of the front edge of the top long pulse by a time indicated by front edge shift time setting signal 113, and outputs the thus shifted top long pulse and the following pulses of the short-pulse group as recording pulse signal 115. This recording pulse signal 115 is converted into semiconductor laser drive current 116 by semiconductor laser drive circuit 105. Laser emission light 117 modulated by intensity modulation by semiconductor laser 106 is irradiated upon the surface of an information recording medium so that recorded marks are formed on the surface of the information recording medium.

Upon reproduction, using laser emission light 117 controlled for recorded data reproduction by semiconductor laser drive circuit 105, reflection light 118 from the surface of the information recording medium is received by photodiode 107, and output signal 119 of photodiode 107 is converted into reproduced signal 120 by reproduction circuit 108. Further, reproduced pulse signal 121 is generated by pulsation circuit 109.

Recording pulse generation circuit 101 is described in detail below with reference to FIGS. 3 and 4.

Figure 3:
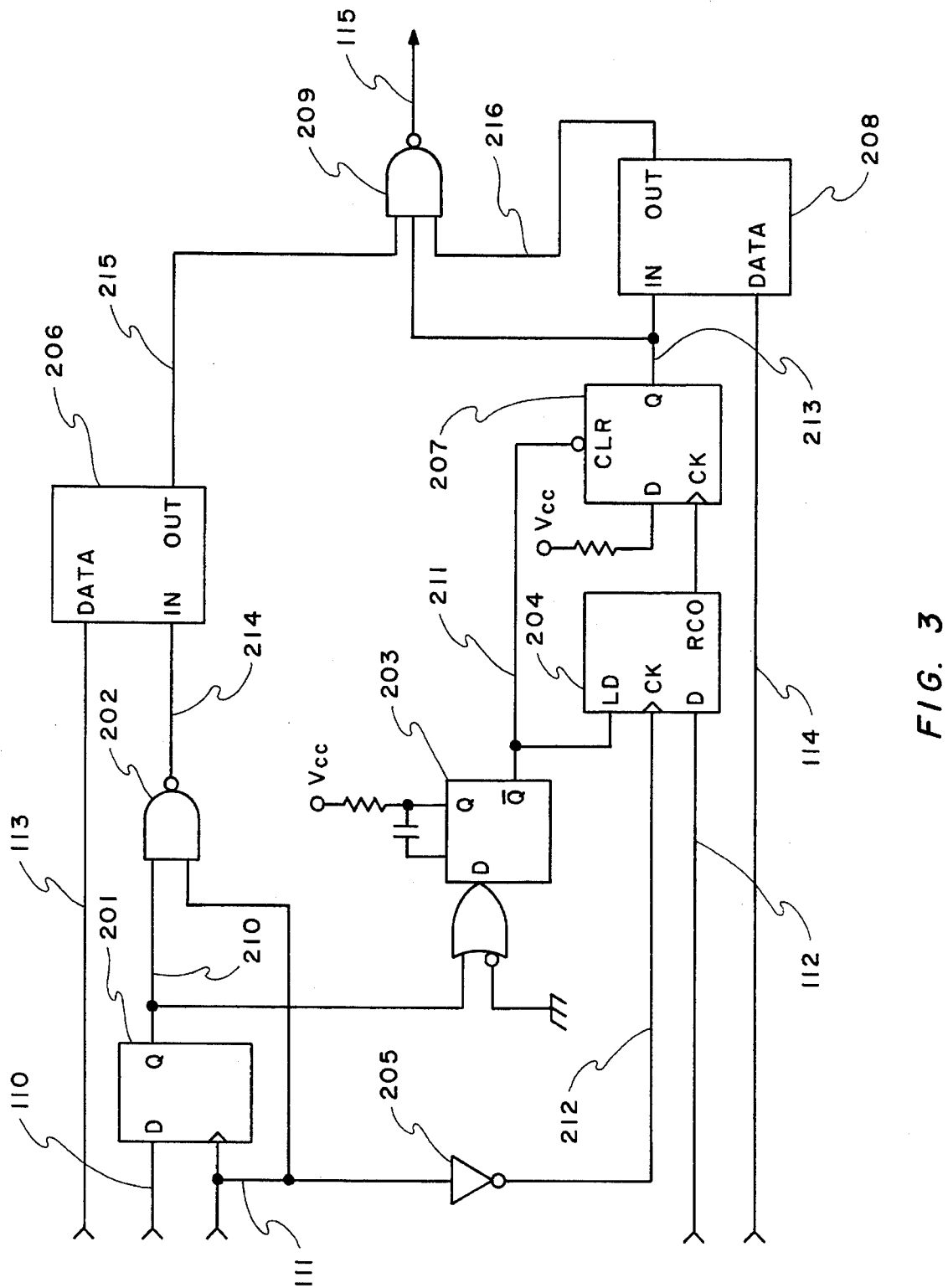
FIG. 3 is a circuit diagram of a recording pulse generation circuit in FIG. 2.
Figure 4:
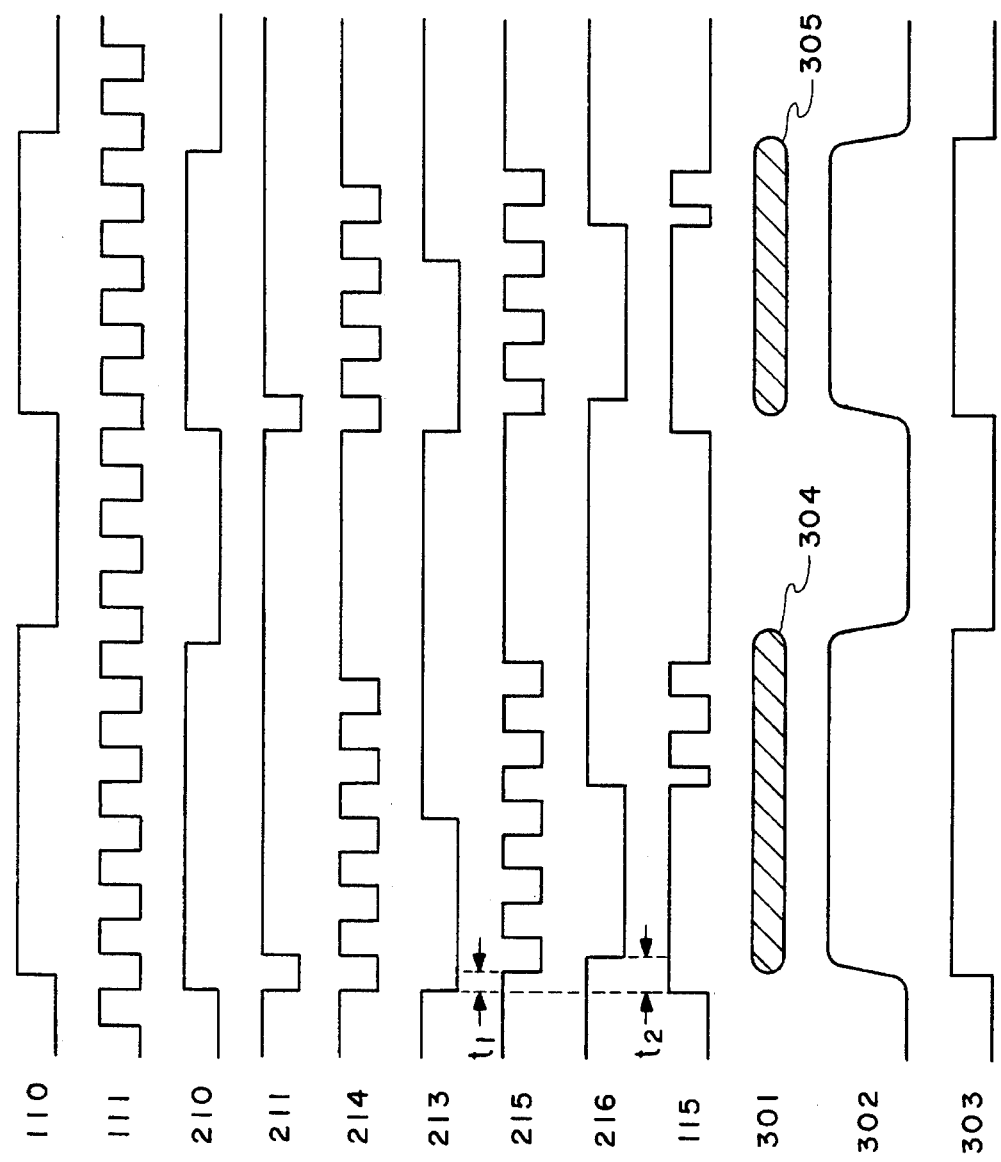
FIG. 4 is a diagram showing the waveforms of signals at different portions of the recording pulse generation circuit of FIG. 3, recorded marks recorded on the surface of an information recording medium, and a reproduced signal.

FIG. 3 is a circuit diagram of recording pulse generation circuit 101, and FIG. 4 is a diagram showing waveforms of signals at different portions of recording pulse generation circuit 101 of FIG. 3, recorded marks recorded on the surface of the information recording medium, and a reproduced signal. Recording data 110 are synchronized with recording reference clock signal 111 by D-type flip-flop 201, and synchronized recording data 210 are outputted from D-type flip-flop 201. Synchronized recording data 210 and recording reference clock signal 111 are inputted to NAND gate 202 so that multi-divided recording pulse signal 214 (short pulse group) is outputted from NAND gate 202. Recording reference clock signal 111 is inverted by inverter 205 so that inverted recording reference clock signal 212 is obtained. Load signal 211 is outputted from monostable multivibrator 203 in response to synchronized recording data 210.

Counter 204 loads a number set by pulse connection number setting signal 112 by load signal 211 and counts inverted recording reference clocks 111. D-type flip-flop 207 inputs load signal 211 to a clear input terminal thereof and, when a carry-over output signal is outputted from counter 204, D-type flip-flop 207 changes the Q output thereof to a high level. In other words, top long pulse 213, which interconnects a number of multi-divided recording pulses 214 beginning with a top multi-divided recording pulse 214 which is set by pulse connection number setting signal 112, is obtained from D-type flip-flop 207.

Variable delay circuit 206 inputs front edge shift time setting signal 113 to data terminal DATA thereof and inputs multi-divided recording pulse signal 214 outputted from NAND gate 202 to input terminal IN thereof, delays multi-divided recording pulse signal 214 by a time indicated by front edge shift time setting signal 113, and outputs delayed multi-divided recording pulse signal 215. Variable delay circuit 208 inputs rear edge shift time setting signal 114 to data terminal DATA thereof and inputs top long pulse 213 to input terminal IN thereof, delays top long pulse 213 by a time indicated by rear edge shift time setting signal 114, and outputs delayed top long pulse 216.

NAND circuit 209 inputs top long pulse 213, delayed multi-divided recording pulse signal 215 and delayed top long pulse 216 and outputs recording pulses 115 whose front and rear edge positions are controlled as recording parameters. Here, the values of t1 and t2 are smaller than one period of recording reference clock signal 111.

Recorded marks 304 and 305 recorded using recording pulses 115 are formed so that, since the energy at the top portion of recording optical pulse 115 in the recording procedure is higher than that of a portion succeeding the top portion, the top portion, which is free from remaining heat, is formed by high thermal energy whereas the succeeding portion is formed with lower thermal energy. Accordingly, the recorded marks do not exhibit a tear-drop shape such as is produced by a conventional information recording and reproducing apparatus, but instead, exhibits a substantially symmetrical shape between the front and rear edges thereof. Consequently, also reproduced signal 302 (denoted at 120 in FIG. 2) has front and rear edges having slopes that are substantially symmetrical relative to each other, and reproduced pulses 303 are obtained (denoted at 121 in FIG. 2) wherein the reproduced signal timing jitter at the front edge is suppressed to a level as low as the jitter at the rear edge.

Further, the influence of heat from the rear half of recording pulse 115 upon a succeeding recorded mark can be reduced as described above in connection with the conventional pulse train recording method. Further, since the position of the top edge of recording pulse 115 can be variably controlled, even if the recording density is raised, the edge shift phenomenon by thermal interference upon recording can be canceled, and recorded marks are formed at accurate timings. Accordingly, reproduced pulses 303 can be produced from a recorded mark train 301 with a minimized edge shift and at accurate timings.

While a preferred embodiment of the invention has here been described in specific terms, this description is for illustrative purposes only, and it is to be understood that changes and variations may be made without departing from the spirit or scope of the following claims.

What is claimed is:

1. An information recording and reproducing apparatus wherein a recording pulse signal is modulated by intensity modulation and converted into an optical pulse signal and the optical pulse signal is optically recorded onto a rotating information recording medium in accordance with a mark length recording method to form a recorded mark train, and thereafter the recorded mark train is optically reproduced, comprising:

recording pulse generating means for dividing the recording pulse signal into multiple pulses with a clock pulse signal, which makes a reference for production of a recording signal, to form a short-pulse group, for connecting an arbitrary number of pulses of the short-pulse group beginning with a top pulse of the short-pulse group to produce a top long pulse, for shifting the positions of the front edge and the rear edge of the top long pulse, and for outputting the shifted top long pulse and the following pulses of the short-pulse group as recording pulses;

semiconductor laser drive means for inputting the recording pulses generated by said recording pulse generation means and converting the recording pulses into semiconductor laser drive current;

a semiconductor laser driven by the semiconductor laser drive current for irradiating intensity modulated laser emission light upon the surface of the information recording medium to form recorded marks and for irradiating laser emission light controlled for recorded data reproduction upon the surface of the information recording medium;

light reception means for receiving reflected light of the laser emission light controlled for recorded data reproduction from the surface of the information recording medium;

reproduction means for converting an output signal of said light reception means into a reproduced signal; and pulsation means for pulsating the reproduced signal to generate reproduced pulses.

2. An information recording and reproducing apparatus as claimed in claim 1, further comprising pulse connection number setting means for setting the number of pulses of the short pulse group to be connected, front edge shift time setting means for setting the time by which the position of the front edge of the top long pulse is to be shifted, and rear edge shift time setting means for setting the time by which the position of the rear edge of the top long pulse is to be shifted.

3. An information recording and reproducing apparatus as claimed in claim 2, wherein the times set by said front edge shift time setting means and said rear edge shift time setting means are equal to or shorter than one period of the clock pulse signal which makes a reference for production of a recording signal.

4. An information recording and reproducing apparatus wherein a recording pulse signal is modulated by intensity modulation and converted into an optical pulse signal and the optical pulse signal is optically recorded onto a rotating information recording medium in accordance with a mark length recording method to form a recorded mark train, and thereafter the recorded mark train is optically reproduced, comprising:

recording pulse generating means for dividing the recording pulse signal into multiple pulses with a clock pulse signal, which makes a reference for production of a recording signal, to form a short-pulse group, for connecting an arbitrary number of pulses of the short-pulse group beginning with a top pulse of the short-pulse group to produce a top long pulse, for shifting the positions of the front edge and the rear edge of the top long pulse, both frontward and backward, and for outputting the shifted top long pulse and the following pulses of the short-pulse group as recording pulses;

semiconductor laser drive means for inputting the recording pulses generated by said recording pulse generation means and converting the recording pulses into semi-conductor laser drive current;

a semiconductor laser driven by the semiconductor laser drive current for irradiating intensity modulated laser emission light upon the surface of the information recording medium to form recorded marks, each of the recorded marks having a front half area and a rear half area, and for irradiating laser emission light controlled for recorded data reproduction upon the surface of the information recording medium, such that the front half area and the rear half area of each of the recorded marks is substantially equal;

light reception means for receiving reflected light of the laser emission light controlled for recorded data reproduction from the surface of the information recording medium;

reproduction means for converting an output signal of said light reception means into a reproduced signal; and pulsation means for pulsating the reproduced signal to generate reproduced pulses.

* * * * *